United States Patent
Okaichi et al.

(10) Patent No.: US 9,927,116 B2
(45) Date of Patent: Mar. 27, 2018

(54) EXHAUST HEAT RECOVERY APPARATUS, HEATING SYSTEM, STEAM BOILER, AND DEODORIZATION SYSTEM

(71) Applicant: Panasonic Intellectual Property Management Co., Ltd., Osaka (JP)

(72) Inventors: Atsuo Okaichi, Osaka (JP); Osao Kido, Kyoto (JP); Takumi Hikichi, Osaka (JP); Osamu Kosuda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 634 days.

(21) Appl. No.: 14/521,240

(22) Filed: Oct. 22, 2014

(65) Prior Publication Data

US 2015/0121876 A1    May 7, 2015

(30) Foreign Application Priority Data

Nov. 1, 2013    (JP) .................................. 2013-228534

(51) Int. Cl.
*F22B 1/18*    (2006.01)
*F01K 11/02*   (2006.01)
(Continued)

(52) U.S. Cl.
CPC .................. *F22B 1/18* (2013.01); *F01K 7/38* (2013.01); *F01K 9/003* (2013.01); *F01K 11/02* (2013.01);
(Continued)

(58) Field of Classification Search
CPC ........ F01K 23/065; F01K 25/08; F01K 13/02; F01K 25/10; F01K 23/10; F01K 13/00;
(Continued)

(56) References Cited

U.S. PATENT DOCUMENTS

| | | | | | |
|---|---|---|---|---|---|
| 3,882,671 | A | * | 5/1975 | Nebgen | ................... F01K 17/06 252/373 |
| 2006/0196187 | A1 | * | 9/2006 | Zimron | ................... F01K 23/04 60/651 |

(Continued)

FOREIGN PATENT DOCUMENTS

| CN | 102777240 | 11/2012 |
|---|---|---|
| EP | 0 786 625 | 7/1997 |

(Continued)

OTHER PUBLICATIONS

English Language machine translation of JP60119305.*
(Continued)

*Primary Examiner* — Mark Laurenzi
*Assistant Examiner* — Wesley Harris
(74) *Attorney, Agent, or Firm* — Wenderoth, Lind & Ponack, L.L.P.

(57) ABSTRACT

An exhaust heat recovery apparatus includes an exhaust heat passage through which a first heat medium holding exhaust heat flows; a second heat medium passage through which the second heat medium, of which temperature is lower than that of the first heat medium, flows; a Rankine cycle which includes a pump, an evaporator, an expander, and a condenser and causes heat exchange at the evaporator between the first heat medium flowing through the exhaust heat passage and a working fluid, so that the working fluid is evaporated, the evaporated working fluid expands at the expander, and power is generated; and an exhaust heat recovery heat exchanger which causes heat exchange between the first heat medium flowing through the exhaust heat passage and the second heat medium flowing through the second heat medium passage, so that the second heat medium is heated and exhaust heat of the first heat medium is recovered.

8 Claims, 7 Drawing Sheets

(51) Int. Cl.
- *F01K 7/38* (2006.01)
- *F01L 13/02* (2006.01)
- *F01K 25/08* (2006.01)
- *F01K 23/06* (2006.01)
- *F01K 17/02* (2006.01)
- *F01K 25/10* (2006.01)
- *F01K 13/00* (2006.01)
- *F01K 9/00* (2006.01)
- *F01K 23/10* (2006.01)
- *F01K 13/02* (2006.01)

(52) U.S. Cl.
CPC .............. *F01K 13/00* (2013.01); *F01K 13/02* (2013.01); *F01K 17/02* (2013.01); *F01K 23/065* (2013.01); *F01K 23/10* (2013.01); *F01K 25/08* (2013.01); *F01K 25/10* (2013.01); *Y02E 10/46* (2013.01); *Y02E 20/12* (2013.01); *Y02E 20/14* (2013.01); *Y02P 80/152* (2015.11); *Y02T 10/16* (2013.01); *Y02T 10/166* (2013.01)

(58) Field of Classification Search
CPC ........ F01K 17/02; Y02T 10/166; Y02T 10/16; Y02E 20/14; Y02E 10/46
See application file for complete search history.

(56) References Cited

U.S. PATENT DOCUMENTS

| | | | |
|---|---|---|---|
| 2009/0000299 A1* | 1/2009 | Ast | ........................ F01K 23/04 60/618 |
| 2009/0277173 A1 | 11/2009 | Ernst et al. | |
| 2012/0210713 A1 | 8/2012 | Ernst et al. | |

FOREIGN PATENT DOCUMENTS

| | | | |
|---|---|---|---|
| JP | 60-4903 | 4/1985 | |
| JP | 60119305 A | * 6/1985 | ............ F01K 25/08 |
| JP | 3042394 | 5/2000 | |
| JP | 2003-232226 | 8/2003 | |
| JP | 2003-278598 | 10/2003 | |

OTHER PUBLICATIONS

English translation of JP 2003-278598, Oct. 2, 2003.
English Translation of Search Report dated Jan. 25, 2017 in corresponding Chinese Application No. 201410592260.2.
European Search Report dated May 11, 2015 in corresponding European Application No. 14190397.1.
English translation of JP 2003-278598, dated Oct. 2, 2003.

* cited by examiner

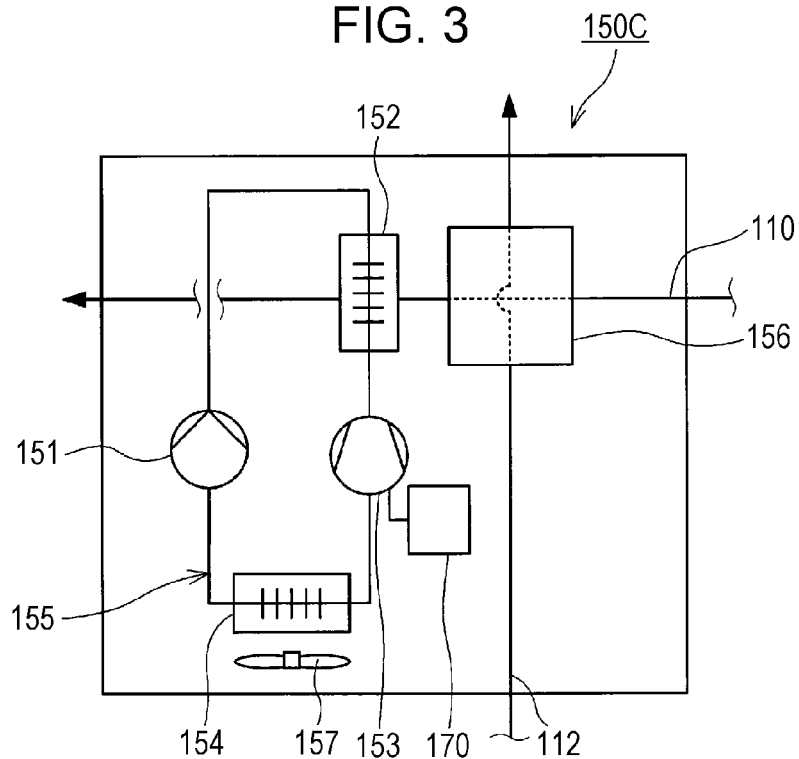
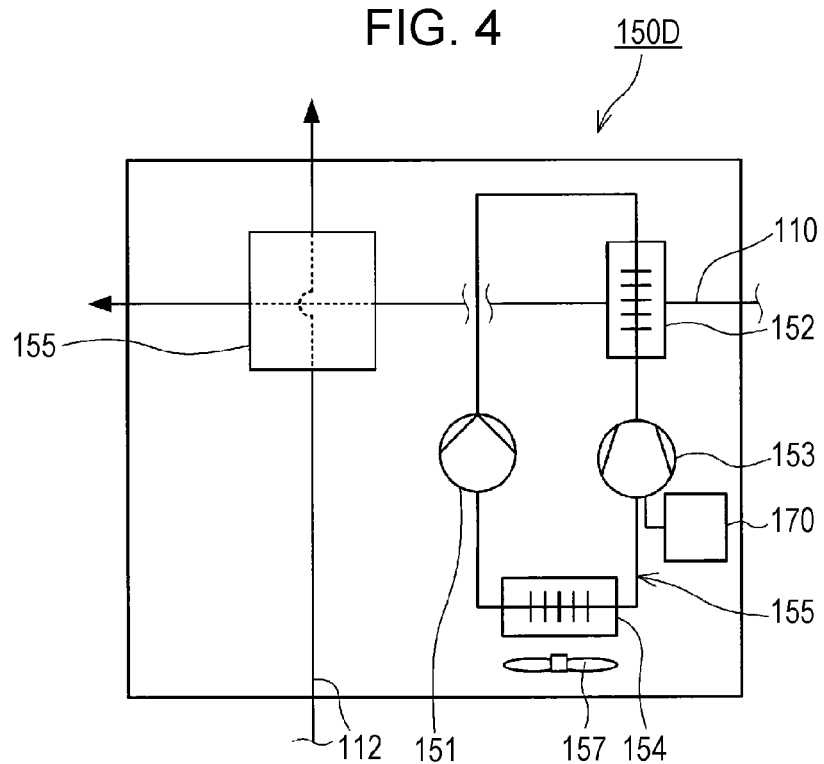

EXHAUST HEAT RECOVERY APPARATUS, HEATING SYSTEM, STEAM BOILER, AND DEODORIZATION SYSTEM

BACKGROUND

1. Technical Field

The present disclosure relates to an exhaust heat recovery apparatus. The present disclosure also relates to a heating system, a steam boiler, and a deodorization system which include the exhaust heat recovery apparatus.

2. Description of the Related Art

As means for utilizing exhaust heat efficiently, a Rankine cycle has been known in which work is taken out using a temperature difference between a high-temperature heat source that has exhaust heat and a low-temperature heat source that needs preheating. For example, an exhaust heat recovery apparatus provided with a Rankine cycle has been known in which exhaust gas discharged from an engine using combustible gas for fuel is used as a high-temperature heat source and combustible gas gasified from liquid-state fuel is used as a low-temperature heat source.

Japanese Unexamined Patent Application Publication No. 2003-278598 describes an exhaust heat recovery apparatus 500 as illustrated in FIG. 9. A working fluid (for example, fluorocarbon) in a Rankine cycle condenses at a condenser 520 by cooling at a constant pressure, by utilizing evaporation latent heat of combustible gas which is supplied from a tank 516 to a combustion engine 510. A pump 532 adiabatically compresses the working fluid. By utilizing heat of exhaust gas through heat exchange at a heat exchanger 514, the working fluid is heated at a constant pressure and evaporated. The working fluid evaporated by a turbine 526 is adiabatically expanded, and exhaust heat held by the exhaust gas is taken out as work.

SUMMARY

The exhaust heat recovery apparatus described in Japanese Unexamined Patent Application Publication No. 2003-278598 has room for improvement in view of increasing the operation efficiency of the Rankine cycle and utilizing exhaust heat efficiently.

In the light of the above conditions, one non-limiting and exemplary embodiment provides an exhaust heat recovery apparatus with a higher operation efficiency of a Rankine cycle which allows more efficient use of exhaust heat than known apparatuses.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

The present disclosure provides an exhaust heat recovery apparatus including an exhaust heat passage through which a first heat medium holding exhaust heat flows; a second heat medium passage through which a second heat medium flows, a temperature of the second heat medium being lower than that of the first heat medium; a Rankine cycle which includes a pump, an evaporator, an expander, and a condenser and which causes heat exchange to be performed at the evaporator between the first heat medium flowing through the exhaust heat passage and a working fluid, so that the working fluid is evaporated, the evaporated working fluid expands at the expander, and power is generated; and an exhaust heat recovery heat exchanger which causes heat exchange to be performed between the first heat medium flowing through the exhaust heat passage and the second heat medium flowing through the second heat medium passage, so that the second heat medium is heated and the exhaust heat held by the first heat medium is recovered.

These general and specific aspects may be implemented using a system and a method and any combination of systems and methods.

According to the present disclosure, it is possible to provide an exhaust heat recovery apparatus with a higher operation efficiency of the Rankine cycle which allows more efficient use of exhaust heat than known apparatuses.

BRIEF DESCRIPTION OF THE DRAWINGS

FIG. 3 is a block diagram of an exhaust heat recovery apparatus according to a second modified example.

FIG. 4 is a block diagram of an exhaust heat recovery apparatus according to a third modified example.

DETAILED DESCRIPTION

Figure 1:
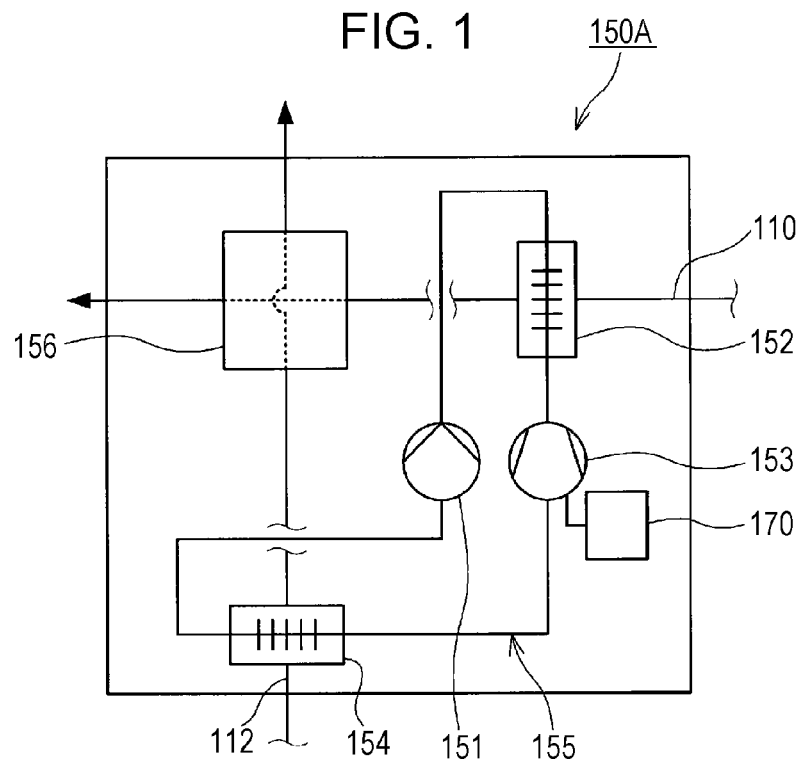
FIG. 1 is a block diagram of an exhaust heat recovery apparatus according to a first embodiment.

In the case where power is generated by a Rankine cycle, for example, in the case where electric power is generated by the Rankine cycle, power generation efficiency in the power generation end of the Rankine cycle is obtained by dividing power generation output from a power generator by the quantity of heat recovered at an evaporator. When a high-temperature working fluid that has been heated and evaporated by the evaporator flows into a low-pressure condenser, a rotational mechanism in an expander or turbine rotates, and power (work) is generated. Accordingly, the power generator is driven, and electric power is generated. That is, the larger the difference between the pressure of the working fluid at the evaporator and the pressure of the working fluid at the condenser, the larger the power generation output to be generated by the power generator.

The pressure of the working fluid at the evaporator and the pressure of the working fluid at the condenser are determined by the temperature at which the working fluid evaporates at the evaporator and the temperature at which the working fluid condenses at the condenser, respectively. The temperature at which the working fluid evaporates is affected by the lowest temperature of a high-temperature heat source and the heat exchange performance of the evaporator. The temperature at which the working fluid condenses is affected by the highest temperature of a low-temperature heat source and the heat exchange performance of the condenser. In the case where exhaust heat recovery from exhaust gas as a high-temperature heat source is performed by the Rankine cycle alone, as with the exhaust heat recovery apparatus 500 described in Japanese Unexamined Patent Application Publication No. 2003-278598, an attempt to increase the recovery amount of exhaust heat at the heat exchanger 514 will decrease the exhaust gas temperature after the heat recovery, resulting in a decrease of the temperature at which the working fluid evaporates. Therefore, the difference between the pressure of the working fluid at the evaporator and the pressure of the working fluid at the condenser decreases, and the power generation output decreases. As a result, a known exhaust heat recovery apparatus may operate with low power generation efficiency of the Rankine cycle. Further, when the temperature of the high-temperature heat source is too high, then, the pump of the Rankine cycle requires a larger amount of power, and the efficiency of the Rankine cycle is thus deteriorated.

In the exhaust heat recovery apparatus 500 disclosed in Japanese Unexamined Patent Application Publication No. 2003-278598, an attempt to maintain exhaust gas in the heat exchanger 514 at a high temperature results in a decrease in the recovery amount of exhaust heat held by the exhaust gas, making it difficult to utilize the exhaust heat held by the exhaust gas efficiently.

Further, since a known exhaust heat recovery apparatus performs the entire exhaust heat recovery process by the Rankine cycle, the amount of heat exchange becomes large relative to the amount of power generation. Therefore, the size of the Rankine cycle increases, and it is difficult to reduce the cost.

According to a first aspect of the present disclosure, there is provided an exhaust heat recovery apparatus including an exhaust heat passage through which a first heat medium holding exhaust heat flows; a second heat medium passage through which a second heat medium flows, a temperature of the second heat medium being lower than that of the first heat medium; a Rankine cycle which includes a pump, an evaporator, an expander, and a condenser, and which causes heat exchange to be performed at the evaporator between the first heat medium flowing through the exhaust heat passage and a working fluid, so that the working fluid is evaporated, the evaporated working fluid expands at the expander, and power is generated; and an exhaust heat recovery heat exchanger which causes heat exchange to be performed between the first heat medium flowing through the exhaust heat passage and the second heat medium flowing through the second heat medium passage, so that the second heat medium is heated and the exhaust heat held by the first heat medium is recovered.

According to the first aspect, the exhaust heat held by the first heat medium is recovered by the exhaust heat recovery heat exchanger, and heat exchange can be performed at the evaporator between the first heat medium which is within a suitable temperature range as a high-temperature heat source, and the working fluid. Therefore, high operation efficiency of the Rankine cycle can be attained. Further, the second heat medium can be heated by the exhaust heat held by the first heat medium that has not been recovered by the Rankine cycle, allowing efficient use of the exhaust heat held by the first heat medium. Because it is possible to reduce the amount of exhaust heat recovered by the Rankine cycle, the size of the Rankine cycle can be reduced, and cost reduction can thus be attained.

According to a second aspect of the present disclosure, in the first aspect, the second heat medium passage may be configured to supply to a specific heat process the second heat medium that has been heated at the exhaust heat recovery heat exchanger. According to the second aspect, the second heat medium supplied to the specific heat process can be preheated by the exhaust heat recovery heat exchanger using the exhaust heat held by the first heat medium.

According to a third aspect of the present disclosure, in the first or second aspect, the exhaust heat recovery apparatus may further include a power generator which generates electric power by the power. According to the third aspect, thermal energy can be converted into electric energy with a large amount of energy.

According to a fourth aspect of the present disclosure, in any one of the first to third aspects, the Rankine cycle may cause heat exchange to be performed at the condenser between the working fluid which has expanded at the expander and the second heat medium which flows through the second heat medium passage located upstream of the exhausted heat recovery heat exchanger, so that the working fluid condenses. According to the fourth aspect, the working fluid can be condensed with the second heat medium which has not been heated by the exhaust heat recovery heat exchanger.

According to a fifth aspect of the present disclosure, in the fourth aspect, the exhaust heat recovery heat exchanger may cause heat exchange to be performed between the first heat medium which has been subjected to the heat exchange with the working fluid at the evaporator and which flows through the exhaust heat passage, and the second heat medium which has been subjected to the heat exchange with the working fluid at the condenser and which flows through the second heat medium passage. According to the fifth aspect, due to a large temperature difference between the first heat medium at the evaporator as a high-temperature heat source and the second heat medium at the condenser as a low-temperature heat source, high power generation efficiency at the Rankine cycle can be attained. Further, the exhaust heat held by the first heat medium which has been subjected to the heat exchange at the evaporator with the working fluid can be recovered by the exhaust heat recovery heat exchanger, allowing efficient use of the exhaust heat held by the first heat medium.

According to a sixth aspect of the present disclosure, in the fourth aspect, the exhaust heat recovery heat exchanger may cause heat exchange to be performed between the first heat medium which flows through the exhaust heat passage located upstream of the evaporator, and the second heat medium which has been subjected to the heat exchange with the working fluid at the condenser and which flows through the second heat medium passage. According to the sixth aspect, when the temperature of the first heat medium is too high for the Rankine cycle, the temperature of the working fluid at the evaporator can be reduced as appropriate by heat exchange with the second heat medium at the exhaust heat recovery heat exchanger. Therefore, the temperature of the first heat medium at the evaporator falls within a temperature range where the Rankine cycle operates efficiently. Furthermore, the amount of exhaust heat recovered by the Rankine cycle can be decreased, and the size of the Rankine cycle can thus be reduced.

According to a seventh aspect of the present disclosure, in any one of the first to third aspects, the Rankine cycle may cause heat exchange to be performed at the condenser between the working fluid which has expanded at the expander and a cooling medium which is different from the second heat medium, so that the working fluid condenses. The exhaust heat recovery heat exchanger may cause heat exchange to be performed between the first heat medium which flows through the exhaust heat passage located upstream of the evaporator, and the second heat medium which flows through the second heat medium passage. According to the seventh aspect, when the temperature of the second heat medium is not appropriate as a low-temperature heat source for the Rankine cycle, the working fluid can be condensed at the condenser using the cooling medium which is different from the second heat medium. Further, when the temperature of the first heat medium is too high for the Rankine cycle, the temperature of the working fluid at the evaporator can be reduced as appropriate by heat exchange with the second heat medium at the exhaust heat recovery heat exchanger. Therefore, the temperature of the first heat medium at the evaporator falls within a temperature range where the Rankine cycle operates efficiently. Furthermore, the amount of exhaust heat recovered by the Rankine cycle can be decreased, and the size of the Rankine cycle can thus be reduced.

According to an eighth aspect of the present disclosure, in any one of the first to third aspects, the Rankine cycle may cause heat exchange to be performed at the condenser between the working fluid which has expanded at the expander and a cooling medium which is different from the second heat medium, so that the working fluid condenses. The exhaust heat recovery heat exchanger may cause heat exchange to be performed between the first heat medium which has been subjected to the heat exchange with the working fluid at the evaporator and which flows through the exhaust heat passage, and the second heat medium which flows through the second heat medium passage. According to the eighth aspect, when the temperature of the second heat medium is not appropriate as a low-temperature heat source for the Rankine cycle, the working fluid can be condensed at the condenser using the cooling medium which is different from the second heat medium. Further, due to a large temperature difference between the first heat medium at the evaporator as a high-temperature heat source and the cooling medium at the condenser as a low-temperature heat source, high power generation efficiency at the Rankine cycle can be attained. Furthermore, the exhaust heat held by the first heat medium which has been subjected to heat exchange at the evaporator with the working fluid can be recovered by the exhaust heat recovery heat exchanger, allowing efficient use of the exhaust heat held by the first heat medium.

According to a ninth aspect of the present disclosure, there is provided a heating system including a combustor; a heating space in which an object to be heated is heated using heat generated at the combustor; an exhaust passage through which the exhaust gas generated in the heating space is discharged; a suction passage through which outside air is supplied to the combustor; and the exhaust heat recovery apparatus according to any one of the fifth to eighth aspects. The exhaust heat passage is connected to the exhaust passage so that the exhaust gas is supplied as the first heat medium to the exhaust heat passage. The second heat medium passage forms at least part of the suction passage so that the outside air is supplied as the second heat medium to the combustor through the second heat medium passage.

According to the ninth aspect, power can be generated by using exhaust heat held by the exhaust gas generated in the heating space, and outside air to be supplied to the combustor can be preheated at the exhaust heat recovery apparatus. Accordingly, fuel used by the combustor can be saved.

According to a tenth aspect of the present disclosure, in the ninth aspect, the heating system may further include a reheating passage through which part of air in the heating space is supplied to the combustor. According to the tenth aspect, part of the air in the heating space is supplied to the combustor, and fuel used by the combustor can thus be saved.

According to an eleventh aspect of the present disclosure, there is provided a steam boiler including a combustor; a steam generator which causes heat exchange to be performed between combustion gas generated at the combustor and liquid, so that the liquid is evaporated; a liquid supply passage through which the liquid is supplied to the steam generator; and the exhaust heat recovery apparatus according to any one of the fifth to eighth aspects. The exhaust heat passage is configured such that the combustion gas which has been subjected to the heat exchange at the steam generator with the liquid flows through the exhaust heat passage as the first heat medium. The second heat medium passage forms at least part of the liquid supply passage so that the liquid to be supplied to the steam generator is supplied as the second heat medium to the steam generator through the second heat medium passage.

According to the eleventh aspect, power can be generated by using exhaust heat held by the heat medium which has been subjected to heat exchange at the steam generator, and liquid to be supplied to the steam generator can be preheated. Accordingly, fuel used by the combustor can be saved.

According to a twelfth aspect of the present disclosure, there is provided a deodorization system including a combustor which combusts odor material; an exhaust gas passage through which exhaust gas generated by combusting the odor material at the combustor is discharged; a process fluid passage through which a process fluid is supplied to a specific heat process; and the exhaust heat recovery apparatus according to any one of the fifth to eighth aspects. The exhaust heat passage is connected to the exhaust gas passage so that the exhaust gas is supplied as the first heat medium to the exhaust heat passage. The second heat medium passage forms at least part of the process fluid passage so that the process fluid is supplied as the second heat medium to the specific heat process through the second heat medium passage.

According to the twelfth aspect, power can be generated by using exhaust heat held by the exhaust gas generated by combusting the odor material, and the process fluid to be supplied to the specific heat process can be preheated at the exhaust heat recovery apparatus.

According to a thirteenth aspect of the present disclosure, in the twelfth aspect, the combustor may include a preheat unit which preheats the odor material, and a catalytic combustion unit which performs catalytic combustion by bringing the preheated odor material into contact with a catalyst. According to the thirteenth aspect, the odor material can be combusted by using a catalytic combustion method.

According to a fourteenth aspect of the present disclosure, in the twelfth or thirteenth aspect, the deodorization system may further include a concentration unit which concentrates the odor material by adsorbing the odor material onto an adsorbent and then desorbing the odor material from the adsorbent; and a supply passage through which the odor material concentrated at the concentration unit is supplied to the combustor. As the specific heat process, the adsorbent onto which the odor material is adsorbed may be heated by the process fluid that has passed through the second heat medium passage, and the odor material may be desorbed from the adsorbent. According to the fourteenth aspect, the odor material which has been adsorbed onto the adsorbent in the concentration unit can be desorbed and concentrated by using the preheated process fluid at the exhaust heat recovery apparatus.

Embodiments of the present disclosure will be described hereinafter with reference to the figures. The description provided below only concerns examples of the present disclosure and the present disclosure is not limited to the description provided below.

Exhaust Heat Recovery Apparatus

An exhaust heat recovery apparatus 150A according to a first embodiment includes an exhaust heat passage 110, a second heat medium passage 112, a Rankine cycle 155, and an exhaust heat recovery heat exchanger 156, as illustrated in FIG. 1. The exhaust heat passage 110 is a flow passage through which a first heat medium holding exhaust heat flows. The first heat medium is, for example, exhaust gas generated by combustion, or a high-temperature exhaust fluid such as pressurized water or oil. The second heat medium passage 112 is a flow passage through which a second heat medium, of which temperature is lower than that of the first heat medium, flows. The second heat medium is, for example, gas such as outdoor air, or liquid such as water, supplied from outside of the exhaust heat recovery apparatus 150A.

The Rankine cycle 155 includes a pump 151, an evaporator 152, an expander 153, and a condenser 154, which are connected by pipes in the order of the pump 151, the evaporator 152, the expander 153, and the condenser 154. A working fluid circulates through the Rankine cycle 155. In the Rankine cycle 155, the working fluid is evaporated by heat exchange at the evaporator 152 between the working fluid and the first heat medium flowing through the exhaust heat passage 110. That is, the first heat medium flowing through the exhaust heat passage 110 is a high-temperature heat source for the Rankine cycle 155. The evaporator 152 is, for example, a double-tube-type heat exchanger, a plate-type heat exchanger, a fin-tube-type heat exchanger, or a shell-and-tube-type heat exchanger. The evaporator 152 is, for example, positioned on the exhaust heat passage 110. The working fluid in the Rankine cycle 155 is not limited in particular. However, the working fluid may be, for example, water, alcohol, ammonia, hydrocarbon, or halocarbon.

The Rankine cycle 155 generates power by expansion of the evaporated working fluid in the expander 153. The expander 153 includes a rotational mechanism. The expander 153 is, for example, a turbine or a displacement-type expander. The displacement-type expander includes a scroll-type expander, a rotary-type expander, and the like. The exhaust heat recovery apparatus 150A further includes a power generator 170. The power generator 170 is driven by the expander 153. The power generator 170 is coupled to the expander 153, for example, by a shaft. The power generator 170 generates electric power by the power generated by the Rankine cycle 155. Therefore, thermal energy can be converted into electric energy with a large amount of energy. The expander 153 and the power generator 170 may be integrated together so that they are accommodated within the same housing or may be accommodated in different housings.

The exhaust heat recovery heat exchanger 156 is a heat exchanger which causes heat exchange to be performed between the first heat medium flowing through the exhaust heat passage 110 and the second heat medium flowing through the second heat medium passage 112, so that the second heat medium is heated, and the exhaust heat held by the first heat medium is recovered. That is, part of the exhaust heat passage 110 and part of the second heat medium passage 112 form the exhaust heat recovery heat exchanger 156. Alternatively, the exhaust heat recovery heat exchanger 156 is positioned on the exhaust heat passage 110 or on the second heat medium passage 112. The exhaust heat recovery heat exchanger 156 is, for example, a double-tube-type heat exchanger, a plate-type heat exchanger, a fin-tube-type heat exchanger, or a shell-and-tube-type heat exchanger.

The second heat medium passage 112 is configured to supply the second heat medium, which has been heated at the exhaust heat recovery heat exchanger 156, to a specific heat process. A heat process means a process which involves chemical or physical changes caused by heat. The specific heat process varies depending on the use of the exhaust heat recovery apparatus 150A. The specific heat process includes, for example, phase changes by heating, combustion, evaporation, and the like, or desorption from an adsorbent. The second heat medium to be supplied to the specific heat process can be preheated by the exhaust heat recovery heat exchanger 156.

The condenser 154 is positioned upstream of the exhaust heat recovery heat exchanger 156 on the second heat medium passage 112. The Rankine cycle 155 condenses the working fluid at the condenser 154, by causing heat exchange to be performed between the working fluid which has expanded at the expander 153 and the second heat medium which has not been subjected to heating by the exhaust heat recovery heat exchanger 156 and which flows through the second heat medium passage 112. That is, the second heat medium flowing through the second heat medium passage 112 is a low-temperature heat source for the Rankine cycle 155. The condenser 154 is, for example, a double-tube-type heat exchanger, a fin-tube-type heat exchanger, a plate-type heat exchanger, or a shell-and-tube-type heat exchanger. The working fluid can be condensed by the second heat medium which has not been subjected to heating at the exhaust heat recovery heat exchanger 156. Further, the second heat medium can be preheated at the condenser 154.

The exhaust heat recovery heat exchanger 156 is positioned downstream of the evaporator 152 on the exhaust heat passage 110 and positioned downstream of the condenser 154 on the second heat medium passage 112. That is, the exhaust heat recovery heat exchanger 156 causes heat exchange to be performed between the first heat medium which has been subjected to the heat exchange with the working fluid at the evaporator 152 and which flows through the exhaust heat passage 110, and the second heat medium which has been subjected to the heat exchange with the working fluid at the condenser 154 and which flows through the second heat medium passage 112.

Operation of the exhaust heat recovery apparatus 150A will now be described. When the temperature of the first heat medium which is to exchange heat with a working fluid at the evaporator 152 and which flows through the exhaust heat passage 110 falls within a range, for example, between 100 degrees Centigrade and 150 degrees Centigrade, inclusive, a liquid-phase working fluid sealed in the Rankine cycle 155 is sent by the pump 151 to the evaporator 152. At the evaporator 152, exhaust heat held by the first heat medium flowing through the exhaust heat passage 110 is recovered, and the exhaust heat evaporates the working fluid. Evaporation of the working fluid sent to the evaporator 152 by the work of the pump 151 causes an increase of steam pressure, which results in the working fluid having a high pressure between the outlet of the pump 151 and the inlet of the expander 153 in the Rankine cycle 155. At that time, the evaporator 152 is cooled by evaporation of the working fluid, and is therefore protected from exhaust heat held by the first heat medium.

At the evaporator 152, heat is exchanged between the working fluid and the first heat medium flowing though the exhaust heat passage 110. The first heat medium flows through the exhaust heat passage 110 from the upstream side to the downstream side. Since two fluids of different temperatures exchange heat at the evaporator 152, the thickness of a thermal boundary layer at the surface of the heat exchanger making up the evaporator 152 can be reduced. Because of the high thermal conductivity on the surface of the heat exchanger and the high heat exchange efficiency of the evaporator 152, the size of the evaporator 152 can be reduced.

The working fluid is cooled by heat exchange with the second heat medium flowing through the second heat medium passage 112, and the working fluid therefore condenses at the condenser 154. In the Rankine cycle 155, the working fluid has a low pressure between the outlet of the expander 153 and the inlet of the pump 151. Therefore, the pressure of the working fluid on the evaporator 152 side of the expander 153 becomes high, and the pressure of the working fluid on the condenser 154 side of the expander 153 becomes low. Thus, a gas-phase working fluid, which has been heated and evaporated by the evaporator 152, passes through the expander 153 and flows into the condenser 154. The expander 153 converts the flow energy of the working fluid into rotating force by the rotational mechanism. Thus, the Rankine cycle 155 generates power. With this rotating force, the power generator 170 is driven, and electric power is generated.

The working fluid which has passed through the expander 153 is supplied to the condenser 154, exchanges heat with the second heat medium flowing through the second heat medium passage 112, and heats the second heat medium.

The exhaust heat recovery heat exchanger 156 is positioned downstream of the evaporator 152 on the exhaust heat passage 110 and positioned downstream of the condenser 154 on the second heat medium passage 112. Therefore, the exhaust heat recovery heat exchanger 156 recovers exhaust heat held by the first heat medium flowing through the exhaust heat passage 110, which has not been recovered in the Rankine cycle 155. By the recovered heat, the second heat medium flowing through the second heat medium passage 112 is further heated. This allows efficient use of exhaust heat held by the first heat medium.

The Rankine cycle 155 is configured such that the temperature difference between the high-temperature heat source and the low-temperature heat source falls within a suitable range for the Rankine cycle 155 to operate efficiently. Specifically, the evaporator 152 is positioned on the exhaust heat passage 110 so that the temperature of the first heat medium passing through the evaporator 152 falls within a suitable range. Further, the condenser 154 is positioned on the second heat medium passage 112 so that the temperature of the second heat medium passing through the condenser 154 falls within a suitable range. Accordingly, the recovery amount of exhaust heat held by the first heat medium at the evaporator 152 is limited. As a result, the temperature difference between the high-temperature heat source at the outlet of the evaporator 152 and the low-temperature heat source at the outlet of the condenser 154 is not too small, thereby increasing the power generation efficiency of the Rankine cycle 155. Exhaust heat held by the first heat medium which is capable of efficient operation of the Rankine cycle 155, due to a large temperature difference between the high-temperature heat source and the low-temperature heat source, is recovered by the evaporator 152 of the Rankine cycle 155. On the other hand, exhaust heat held by the first heat medium which is not suitable for efficient operation of the Rankine cycle 155, due to a small temperature difference between the high-temperature heat source and the low-temperature heat source, is recovered by the exhaust heat recovery heat exchanger 156.

The Rankine cycle 155 operates efficiently by providing the exhaust heat recovery apparatus 150A with the exhaust heat recovery heat exchanger 156. This is because heat is exchanged between the working fluid in the Rankine cycle 155 and a high-temperature first heat medium which has not been subjected to cooling by the exhaust heat recovery heat exchanger 156, and between the working fluid in the Rankine cycle 155 and a low-temperature second heat medium which has not been subjected to heating by the exhaust heat recovery heat exchanger 156. Accordingly, the evaporator 152 of the Rankine cycle 155 and the exhaust heat recovery heat exchanger 156 share recovering of exhaust heat held by the first heat medium, and appropriate exhaust heat recovery can thus be performed by the evaporator 152 of the Rankine cycle 155. Further, the amount of exhaust heat recovered by the evaporator 152 of the Rankine cycle 155 can be decreased, enabling reduction in the size of the evaporator 152.

The Rankine cycle 155 causes heat exchange to be performed at the evaporator 152 between the first heat medium flowing through the exhaust heat passage 110 and the working fluid. Accordingly, by using the Rankine cycle 155 and the power generator 170, electric power can be generated. Further, the Rankine cycle 155 causes heat exchange to be performed at the condenser 154 between the working fluid which has expanded by the expander 153 and the second heat medium which has not been subjected to heating by the exhaust heat recovery heat exchanger 156 and which flows through the second heat medium passage 112. This enables preheating of the second heat medium. Further, the exhaust heat recovery heat exchanger 156 causes heat exchange to be performed between the first heat medium flowing through the exhaust heat passage 110 and the second heat medium flowing through the second heat medium passage 112. This enables preheating of the second heat medium. Thus, in the exhaust heat recovery apparatus 150A, exhaust heat recovered from the first heat medium can be utilized not only for generating electric power but also for other purposes such as preheating of the second heat medium. Accordingly, exhaust heat held by the first heat medium can be efficiently utilized.

In the exhaust heat recovery apparatus 150A, the Rankine cycle 155 and the exhaust heat recovery heat exchanger 156 properly share recovering of exhaust heat held by the first heat medium. Therefore, the amount of exhaust heat recovered from the first heat medium by the evaporator 152 of the Rankine cycle 155 is reduced. This also increases power generation efficiency of the Rankine cycle 155. Further, the size of the Rankine cycle 155 can be reduced, and cost reduction of the exhaust heat recovery apparatus 150A can thus be attained.

As long as the Rankine cycle 155 generates power, the exhaust heat recovery apparatus 150A does not need to include the power generator 170. In such a case, power generated by the Rankine cycle 155 can be used to drive machines other than the power generator.

First Modified Example

Figure 2:
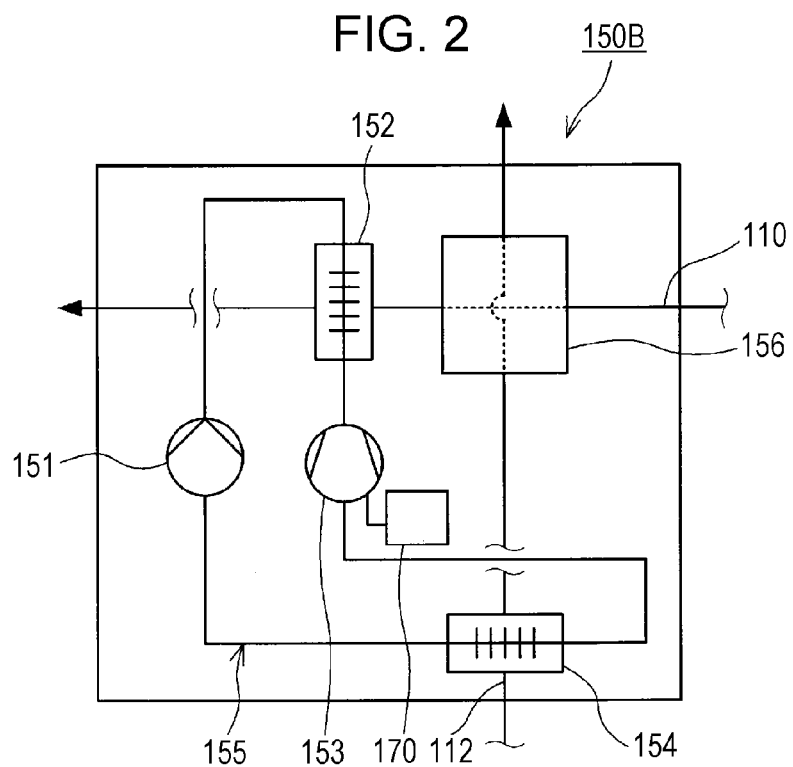
FIG. 2 is a block diagram of an exhaust heat recovery apparatus according to a first modified example.

Modifications may be made to the exhaust heat recovery apparatus 150A from various points of view. The exhaust heat recovery apparatus 150A may be modified to an exhaust heat recovery apparatus 150B according to a first modified example, as illustrated in FIG. 2. The exhaust heat recovery apparatus 150B is configured similarly to the exhaust heat recovery apparatus 150A, unless specifically described otherwise. For the components of the exhaust heat recovery apparatus 150B which are the same as or correspond to those of the exhaust heat recovery apparatus 150A, the same symbols are given and detailed descriptions may be omitted. Descriptions regarding the exhaust heat recovery apparatus 150A are applicable to the exhaust heat recovery apparatus 150B unless technically inconsistent. This also applies to other modified examples.

The exhaust heat recovery heat exchanger 156 of the exhaust heat recovery apparatus 150B is positioned upstream of the evaporator 152 on the exhaust heat passage 110 and positioned downstream of the condenser 154 on the second heat medium passage 112. That is, the exhaust heat recovery heat exchanger 156 causes heat exchange to be performed between the first heat medium which has not been subjected to heat exchange with a working fluid at the evaporator 152 and which flows through the exhaust heat passage 110, and the second heat medium which has been subjected to heat exchange with a working fluid at the condenser 154 and which flows through the second heat medium passage 112. When the temperature of the first heat medium that has flowed into the exhaust heat recovery apparatus 150B is too high for the Rankine cycle 155, the temperature of the first heat medium can be decreased properly before the first heat medium flowing through the exhaust heat passage 110 exchanges heat with the working fluid at the evaporator 152. Thus, the temperature of the high-temperature heat source falls within a range where the Rankine cycle 155 operates efficiently.

In the exhaust heat recovery apparatus 150B, similar to the exhaust heat recovery apparatus 150A, exhaust heat recovered from the first heat medium can be used not only for generating electric power but also for other purposes such as preheating of the second heat medium. This enables efficient use of exhaust heat held by the first heat medium. Further, it is possible to reduce the amount of exhaust heat recovered from the first heat medium by the evaporator 152 of the Rankine cycle 155. Accordingly, the size of the Rankine cycle 155 can be reduced, and cost reduction of the exhaust heat recovery apparatus 150B can thus be attained.

Second Modified Example

The exhaust heat recovery apparatus 150A may be modified to an exhaust heat recovery apparatus 150C according to a second modified example, as illustrated in FIG. 3. The Rankine cycle 155 of the exhaust heat recovery apparatus 150C causes heat exchange to be performed at the condenser 154 between a working fluid expanded by the expander 153 and a cooling medium different from the second heat medium, and thus condenses the working fluid. The exhaust heat recovery apparatus 150C is provided with, for example, a fan 157. The fan 157 supplies outside air of the exhaust heat recovery apparatus 150C as a cooling medium towards the condenser 154. The exhaust heat recovery apparatus 150C may be configured to supply seawater, river water, lake water, or the like, as a cooling medium, to the condenser 154 by a pump. Even in the case where the temperature of the second heat medium flowing through the second heat medium passage 112 is high and therefore not suitable as a low-temperature heat source for the Rankine cycle 155, it is possible to operate the Rankine cycle 155 efficiently.

The exhaust heat recovery heat exchanger 156 is positioned upstream of the evaporator 152 on the exhaust heat passage 110 and positioned downstream of the condenser 154 on the second heat medium passage 112. That is, the exhaust heat recovery heat exchanger 156 causes heat exchange to be performed between the first heat medium which has not been subjected to heat exchange with a working fluid at the evaporator 152 and which flows through the exhaust heat passage 110, and the second heat medium which flows through the second heat medium passage 112.

In the exhaust heat recovery apparatus 150C, when the temperature of the first heat medium is too high for the Rankine cycle 155, exhaust heat held by the first heat medium is recovered by the exhaust heat recovery heat exchanger 156, and the second heat medium is heated. Accordingly, the temperature of the first heat medium is decreased properly before the first heat medium exchanges heat with a working fluid at the evaporator 152. The Rankine cycle 155 uses, as a high-temperature heat source, the first heat medium which has become a temperature suitable for the Rankine cycle 155 by the exhaust heat recovery heat exchanger 156, and uses, as a low-temperature heat source, a cooling medium such as outside air of the exhaust heat recovery apparatus 150C which exists inexhaustibly. Accordingly, electric power is generated by the Rankine cycle 155 and the power generator 170. With the Rankine cycle 155 and the power generator 170, electric power is generated from exhaust heat held by the first heat medium whose temperature has decreased through exhaust heat recovery by the exhaust heat recovery heat exchanger 156.

In the exhaust heat recovery apparatus 150C, similar to the exhaust heat recovery apparatus 150A, exhaust heat recovered from the first heat medium can be used not only for generating electric power but also for other purposes such as preheating of the second heat medium. This enables efficient use of exhaust heat held by the first heat medium. Further, it is possible to reduce the amount of exhaust heat recovered from the first heat medium by the evaporator 152 of the Rankine cycle 155. This also increases the power generation efficiency of the Rankine cycle 155. Further, the size of the Rankine cycle 155 can be reduced, and cost reduction of the exhaust heat recovery apparatus 150C can thus be attained.

Third Modified Example

The exhaust heat recovery apparatus 150A may be modified to an exhaust heat recovery apparatus 150D according to a third modified example, as illustrated in FIG. 4. The Rankine cycle 155 of the exhaust heat recovery apparatus 150D causes heat exchange to be performed at the condenser 154 between a working fluid expanded by the expander 153 and a cooling medium different from the second heat medium, and thus condenses the working fluid, in the same manner as the exhaust heat recovery apparatus 150C. The exhaust heat recovery heat exchanger 156 is positioned upstream of the evaporator 152 on the exhaust heat passage 110 and positioned downstream of the condenser 154 on the second heat medium passage 112. That is, the exhaust heat recovery heat exchanger 156 causes heat exchange to be performed between the first heat medium which has not been subjected to heat exchange with a working fluid at the evaporator 152 and which flows through the exhaust heat passage 110, and the second heat medium which flows through the second heat medium passage 112. The exhaust heat recovery apparatus 150D is configured similarly to the exhaust heat recovery apparatus 150C with the exception that the positional relationship on the exhaust heat passage 110 between the evaporator 152 and the exhaust heat recovery heat exchanger 156 is inverted.

In the exhaust heat recovery apparatus 150D, exhaust heat held by the first heat medium which has flowed into the exhaust heat recovery apparatus 150D at a suitable temperature as a high-temperature heat source for the Rankine cycle 155, can be recovered first by the evaporator 152 of the Rankine cycle 155. Further, in the exhaust heat recovery apparatus 150D, exhaust heat held by the first heat medium which has not been recovered by the evaporator 152, can be recovered by the exhaust heat recovery heat exchanger 156. Thus, in the same manner as the exhaust heat recovery apparatus 150A, the Rankine cycle 155 and the exhaust heat recovery heat exchanger 156 are able to properly share the recovering of exhaust heat held by the first heat medium. Further, even in the case where the temperature of the second heat medium flowing through the second heat medium passage 112 is high and therefore not suitable as a low-temperature heat source for the Rankine cycle 155, it is possible to operate the Rankine cycle 155 efficiently.

Heating System

Figure 5:
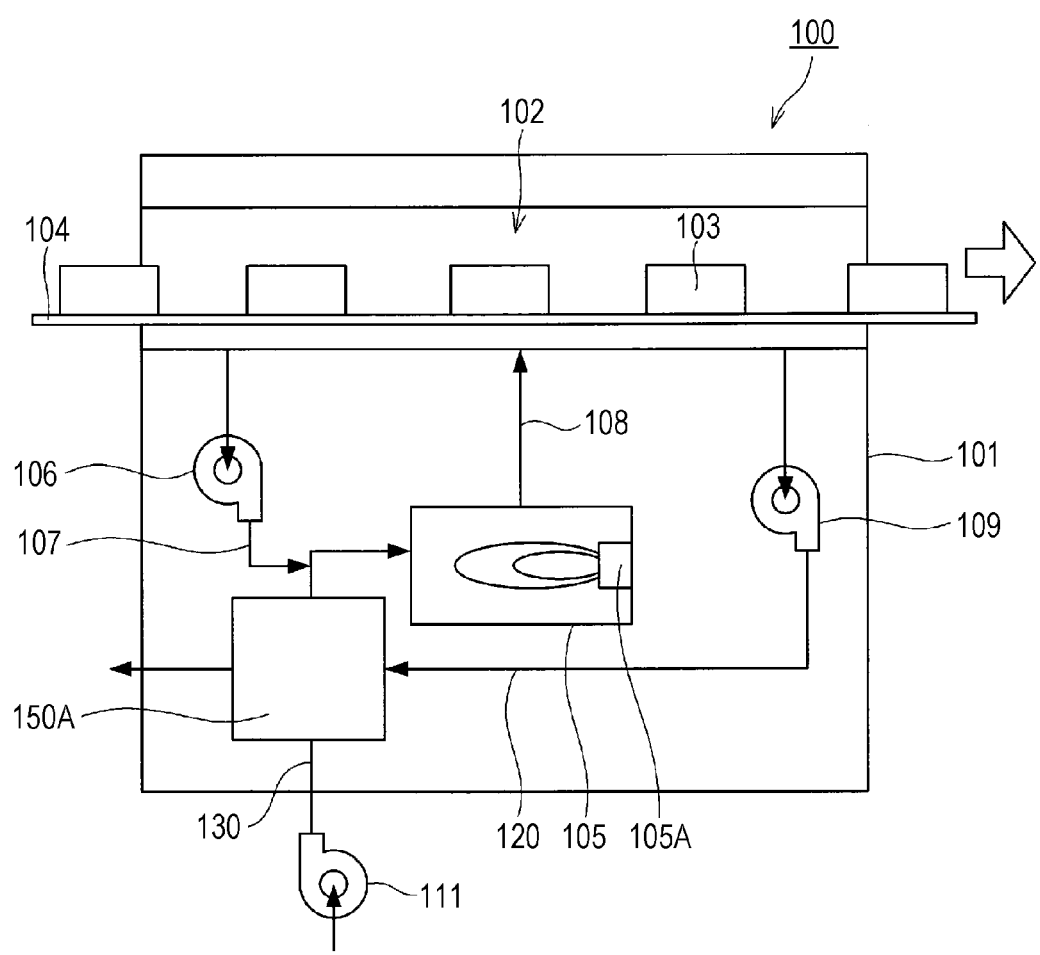
FIG. 5 is a block diagram of a heating system including an exhaust heat recovery apparatus.

Next, a heating system 100 provided with the above-mentioned exhaust heat recovery apparatus will be described. As illustrated in FIG. 5, the heating system 100 includes a furnace body 101, a combustor 105, a heating space 102, an exhaust passage 120, a suction passage 130, a reheating passage 107, a heating passage 108, the exhaust heat recovery apparatus 150A, and a conveyer 104.

The combustor 105 is provided with a burner 105A. The suction passage 130 is a flow passage through which outside air is supplied to the combustor 105. A suction fan 111 is positioned halfway on the suction passage 130. Outside air is supplied to the combustor 105 by operation of the suction fan 111. Thus, at the combustor 105, the burner 105A burns fuel, and heat is generated.

The heating space 102 is connected to the combustor 105 through the heating passage 108. An object 103 to be heated is conveyed to the heating space 102 by the conveyer 104. The heating space 102 is a space in which the object 103 to be heated is heated using heat generated at the combustor 105. The heated object 103 is conveyed out of the heating space 102 by the conveyer 104.

Combustion gas generated at the combustor 105 is continuously supplied to the heating space 102 through the heating passage 108. Therefore, exhaust gas is generated in the heating space 102. The exhaust passage 120 is a flow passage through which exhaust gas generated in the heating space 102 is discharged. The exhaust passage 120 is connected to the heating space 102. An exhaust fan 109 is positioned halfway on the exhaust passage 120. Exhaust gas generated in the heating space 102 is discharged out of the heating system 100 by operation of the exhaust fan 109. The exhaust heat passage 110 of the exhaust heat recovery apparatus 150A is connected to the exhaust passage 120 so that the exhaust gas is supplied as the first heat medium to the exhaust heat passage 110.

The second heat medium passage 112 (see FIG. 1) of the exhaust heat recovery apparatus 150A forms at least part of the suction passage 130 in such a manner that outside air to be supplied to the combustor 105 is supplied as the second heat medium to the combustor 105 through the second heat medium passage 112.

The reheating passage 107 is a flow passage through which part of air in the heating space 102 is supplied to the combustor 105. The reheating passage 107 is connected to the heating space 102. A circulation fan 106 is positioned halfway on the reheating passage 107. Operation of the circulation fan 106 causes the part of air in the heating space 102 to be supplied to the combustor 105 through the reheating passage 107. The reheating passage 107 is connected to the suction passage 130 in the middle of the suction passage 130. Accordingly, outside air flowing through the suction passage 130 and air flowing through the reheating passage 107 are mixed together and supplied to the combustor 105. The reheating passage 107 may be directly connected to the combustor 105 without being connected to the suction passage 130.

Operation of the heating system 100 will now be described. First, the suction fan 111, the exhaust fan 109, and the circulation fan 106 are actuated to generate air flow inside the heating system 100. Next, fuel is supplied to the burner 105A, and the burner 105A is ignited. The mixture of outside air flowing through the suction passage 130 and air flowing through the reheating passage 107 is supplied to the combustor 105, and accordingly fuel is burned by the burner 105A. This generates combustion gas. Further, air in the combustor 105 which is not directly involved in the burning of fuel by the burner 105A is heated by combustion gas. Combustion gas and air heated by the combustion gas pass through the heating passage 108 and are supplied to the heating space 102. Exhaust gas is discharged from the heating space 102 through the exhaust passage 120 at a flow rate similar to that of the outside air supplied to the combustor 105 through the suction passage 130.

After the temperature of the air in the heating space 102 has reached a specific temperature, the object 103 to be heated is conveyed to the heating space 102 by the conveyer 104. The object 103 to be heated is heated in the heating space 102. Thus, processing for the object 103 to be heated including drying, curing of coating in baking finish, brazing, and the like is performed.

The exhaust heat recovery apparatus 150A operates as described above, by using, as the first heat medium, exhaust gas discharged from the heating space 102 and by using, as the second heat medium, outside air flowing through the suction passage 130. Thus, in the exhaust heat recovery apparatus 150A, power generation is performed by the Rankine cycle 155 and the power generator 170, and outside air to be supplied to the combustor 105 is preheated.

The generated electric power is used, for example, for actuating the conveyer 104, the circulation fan 106, the exhaust fan 109, or the suction fan 111, which consumes power in the heating system 100. Accordingly, electric power to be supplied to the heating system 100 from outside can be reduced. Further, because outside air to be supplied to the combustor 105 is preheated by the exhaust heat recovery apparatus 150A, the quantity of heat to be generated by fuel burning at the burner 105A can be reduced. This allows reduction in fuel. As a result, the heating system 100 attains high energy-saving performance. The generated electric power may be supplied to the outside of the heating system 100.

The heating system 100 may be provided with the exhaust heat recovery apparatus 150B, the exhaust heat recovery apparatus 150C, or the exhaust heat recovery apparatus 150D, instead of the exhaust heat recovery apparatus 150A. Further, the reheating passage 107 and the circulation fan 106 may be omitted from the heating system 100.

Steam Boiler

Figure 6:
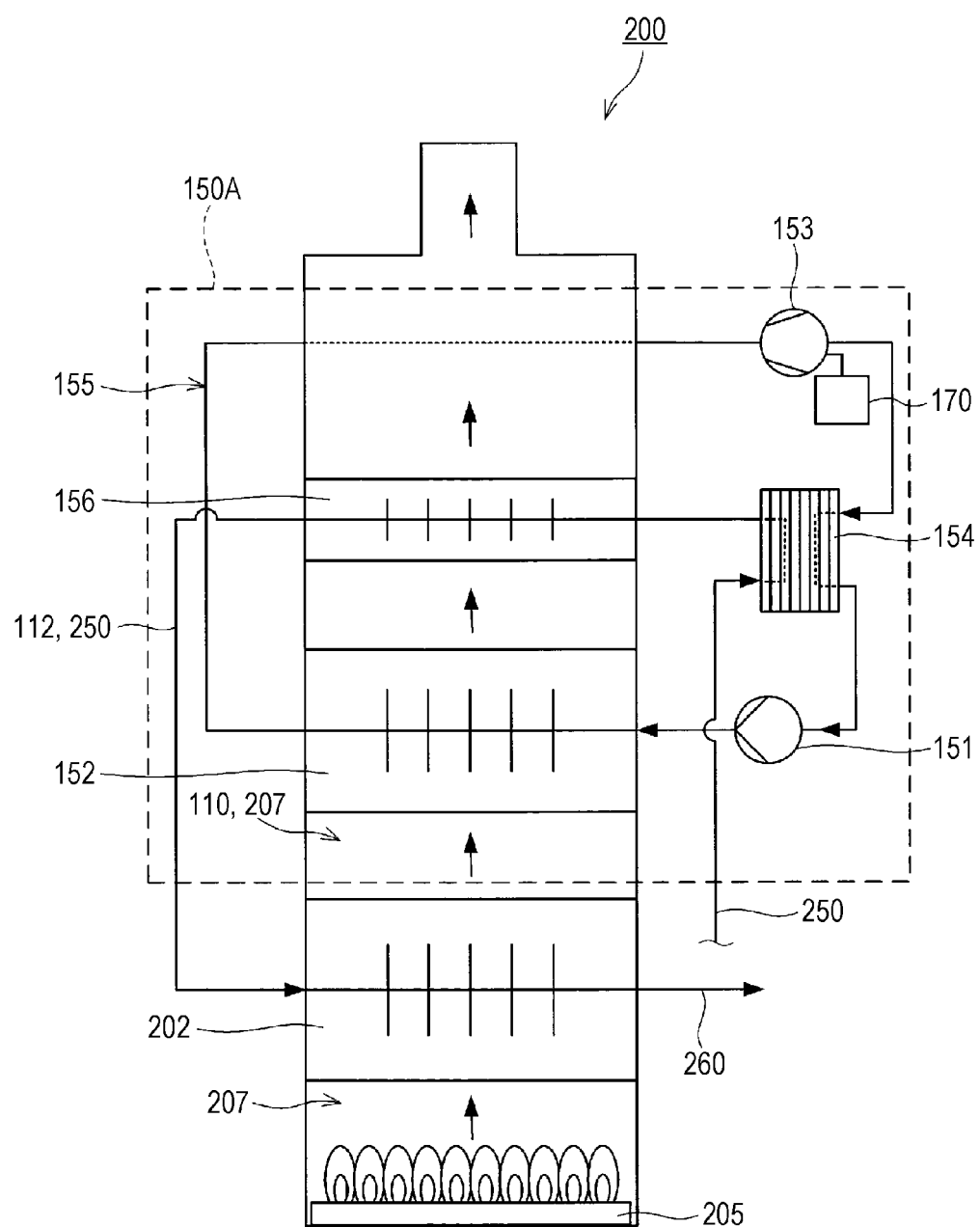
FIG. 6 is a block diagram of a steam boiler including an exhaust heat recovery apparatus.

Next, a steam boiler 200 provided with the above-mentioned exhaust heat recovery apparatus will be described. As illustrated in FIG. 6, the steam boiler 200 includes a combustor 205, a combustion gas passage 207, a steam generator 202, a liquid supply passage 250, a steam passage 260, and the exhaust heat recovery apparatus 150A. The combustor 205 generates combustion gas by combusting fuel. Combustion gas flows through the combustion gas passage 207. The steam generator 202 causes heat exchange to be performed between the combustion gas generated by the combustor 205 and liquid, and thus evaporates the liquid. The liquid evaporated by the steam generator 202 is, for example, water. The steam generator 202 is, for example, a fin-tube-type heat exchanger or a bare-tube-type heat exchanger. The liquid supply passage 250 is a flow passage through which liquid is supplied to the steam generator 202. The liquid supply passage 250 is connected to the steam generator 202. Through the steam passage 260, steam generated by the steam generator 202 is supplied to the outside of the steam boiler 200.

The exhaust heat passage 110 of the exhaust heat recovery apparatus 150A is configured such that combustion gas which has been subjected to heat exchange with liquid at the steam generator 202 flows through the exhaust heat passage 110 as the first heat medium. Specifically, the exhaust heat passage 110 is formed by a portion of the downstream side of the steam generator 202 on the combustion gas passage 207. The second heat medium passage 112 of the exhaust heat recovery apparatus 150A forms at least part of the liquid supply passage 250 in such a manner that the liquid to be supplied to the steam generator 202 is supplied as the second heat medium to the steam generator 202 through the second heat medium passage 112.

Operation of the steam boiler 200 will now be described. First, a pump (illustration is omitted) is actuated to supply liquid to the steam generator 202 through the liquid supply passage 250. Next, fuel is supplied to the combustor 205, and the combustor 205 is ignited. Combustion gas generated by fuel combustion at the combustor 205 flows through the combustion gas passage 207. At the steam generator 202, heat is exchanged between the combustion gas and the liquid inside the steam generator 202. Accordingly, the steam generator 202 evaporates liquid. The steam generated by the steam generator 202 is supplied to the outside of the steam boiler 200 through the steam passage 260.

The exhaust heat recovery apparatus 150A operates as described above, by using, as the first heat medium, combustion gas which has been subjected to heat exchange with liquid at the steam generator 202 and by using, as the second heat medium, liquid to be supplied to the steam generator 202. Thus, in the exhaust heat recovery apparatus 150A, power generation is performed by the Rankine cycle 155 and the power generator 170, and liquid to be supplied to the steam generator 202 is preheated.

The generated electric power is used, for example, for actuating a device which consumes power in the steam boiler 200, such as a pump for letting liquid flow through the liquid supply passage 250 or an air-sending device (illustration is omitted). Accordingly, electric power to be supplied to the steam boiler 200 from outside can be reduced. Further, because liquid to be supplied to the steam generator 202 is preheated by the exhaust heat recovery apparatus 150A, the quantity of heat to be generated by fuel combustion at the combustor 205 can be reduced. This allows reduction in fuel. As a result, the steam boiler 200 attains high energy-saving performance. The generated electric power may be supplied to the outside of the steam boiler 200.

Deodorization System

Figure 7:
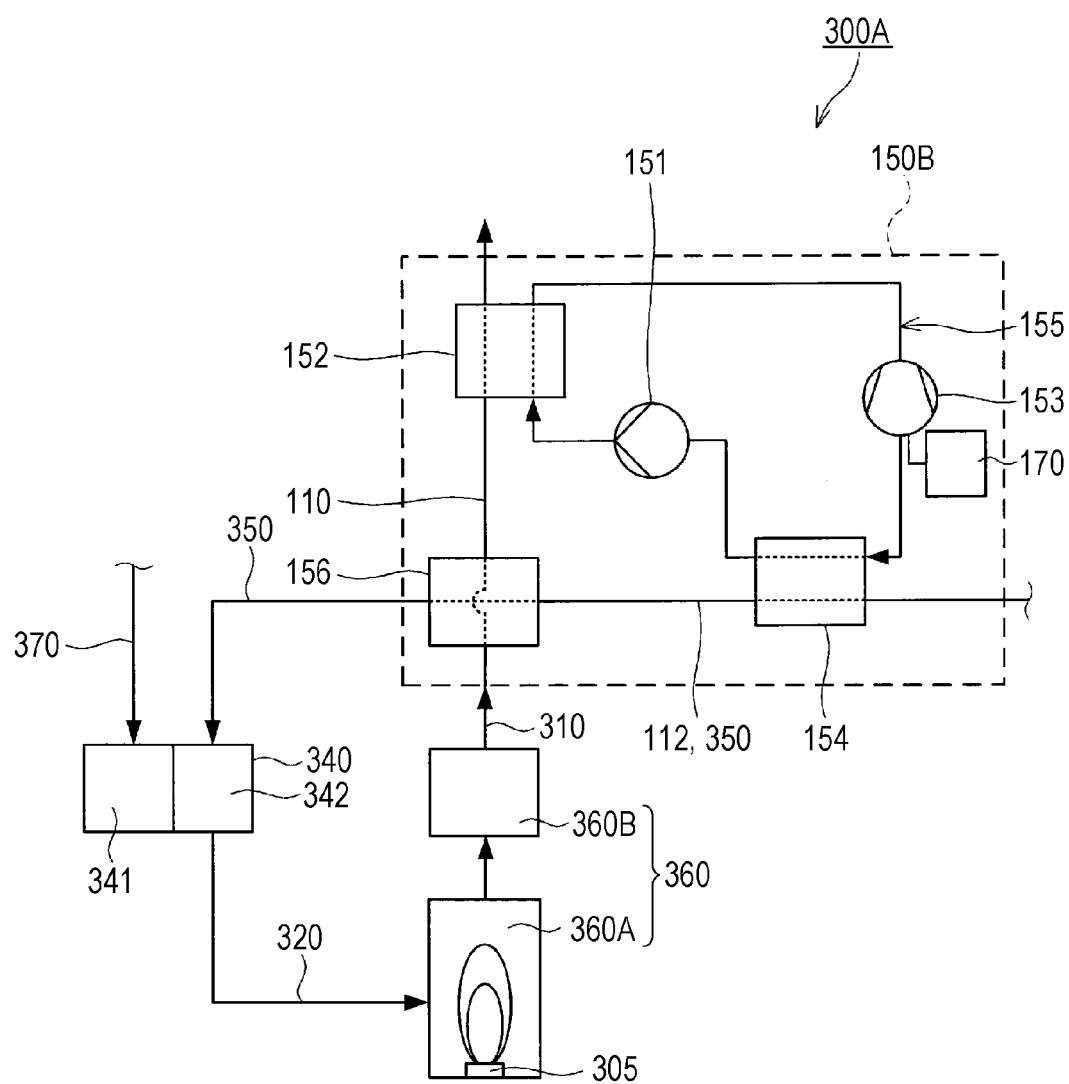
FIG. 7 is a block diagram of a deodorization system including an exhaust heat recovery apparatus.

Next, a deodorization system 300A provided with the above-mentioned exhaust heat recovery apparatus will be described. As illustrated in FIG. 7, the deodorization system 300A includes a combustor 360, an exhaust gas passage 310, a supply passage 320, a process fluid passage 350, the exhaust heat recovery apparatus 150B, a concentration unit 340, and an introduction flow channel 370. The combustor 360 combusts odor material. Accordingly, the odor material is decomposed. The odor material is, for example, an organic compound contained in gas discharged in a manufacturing process in a factory. The concentration unit 340 concentrates the odor material and the concentrated odor material is supplied to the combustor 360. Exhaust gas is generated by combusting the odor material at the combustor 360. The exhaust gas passage 310 is a flow passage through which exhaust gas generated by combusting the odor material at the combustor 360 is discharged.

The process fluid passage 350 is a flow passage through which a process fluid is supplied to a specific heat process. The process fluid is, for example, air sucked from outside of the deodorization system 300A. The process fluid passage 350 is connected to the concentration unit 340, and the process fluid is supplied to the concentration unit 340.

The exhaust heat passage 110 of the exhaust heat recovery apparatus 150B is connected to the exhaust gas passage 310 in such a manner that the exhaust gas generated at the combustor 360 is supplied to the exhaust heat passage 110 as the first heat medium. Further, the second heat medium passage 112 of the exhaust heat recovery apparatus 150B forms at least part of the process fluid passage 350 in such a manner that a process fluid is supplied to the specific heat process as the second heat medium through the second heat medium passage 112.

The combustor 360 includes a preheat unit 360A and a catalytic combustion unit 360B. The preheat unit 360A preheats odor material. The preheat unit 360A has a burner 305. With the heat generated by burning fuel in the burner 305, odor material is preheated. The catalytic combustion unit 360B has a catalyst. The catalyst is, for example, metal such as platinum, palladium, ruthenium, rhodium, silver, or nitrate or chloride of the above-mentioned metal. In the catalytic combustion unit 360B, the catalyst is supported on a structure, such as a metal honeycomb, a ceramic honeycomb, or a pellet. The catalytic combustion unit 360B performs catalytic combustion by bringing the preheated odor material into contact with the catalyst.

After causing an adsorbent to adsorb odor material, the concentration unit 340 causes the odor material to be desorbed from the adsorbent, so that the odor material is concentrated. The supply passage 320 connects the concentration unit 340 with the combustor 360, and is a flow passage through which the odor material concentrated at the concentration unit 340 is supplied to the combustor 360. The concentration unit 340 is provided with, for example, an annular concentrating rotor (illustration is omitted) including an adsorbent. The adsorbent is, for example, zeolite. The concentrating rotor is rotatably mounted in the concentration unit 340. The concentration unit 340 is provided with an adsorbing region 341 and a regeneration region 342. The concentrating rotor rotates so that part of the concentrating rotor passes alternately through the adsorbing region 341 and the regeneration region 342. The introduction flow channel 370 is connected to the adsorbing region 341. Through the introduction flow channel 370, the odor material is supplied to the adsorbing region 341. In the adsorbing region 341, the odor material is adsorbed onto the adsorbent, that is, the concentrating rotor.

The process fluid passage 350 is connected to the regeneration region 342. Through the process fluid passage 350, a process fluid is supplied to the regeneration region 342. The process fluid passes through the second heat medium passage 112 of the exhaust heat recovery apparatus 150B, and the process fluid is therefore preheated by the exhaust heat recovery apparatus 150B. Then, in the regeneration region 342, with the process fluid which has passed through the second heat medium passage 112 of the exhaust heat recovery apparatus 150B, the adsorbent onto which odor material has been adsorbed is heated, so that the odor material is desorbed from the adsorbent. This process corresponds to the specific heat process.

Operation of the deodorization system 300A will now be described. First, the deodorization system 300A actuates, for example, a fan (illustration is omitted) which is provided on the process fluid passage 350. Then, through the process fluid passage 350, the deodorization system 300A supplies outside air of the deodorization system 300A as a process fluid to the regeneration region 342 of the concentration unit 340. Next, fuel is supplied to the burner 305, and the burner 305 is ignited. The concentrating rotor of the concentration unit 340 is rotated. The odor material is supplied to the concentration unit 340 through the introduction flow channel 370, and the odor material is concentrated at the concentration unit 340. The odor material concentrated at the concentration unit 340 is supplied to the preheat unit 360A through the supply passage 320, and is preheated by the burner 305. The preheated odor material is decomposed by catalytic combustion at the catalytic combustion unit 360B, and is thus deodorized. Exhaust gas generated by combusting the odor material is supplied to the exhaust heat recovery apparatus 150B through the exhaust gas passage 310.

The exhaust heat recovery apparatus 150B operates as described above, by using, as the first heat medium, exhaust gas that has been generated by combusting the odor material at the combustor 360 and supplied through the exhaust gas passage 310 and by using, as the second heat medium, a process fluid flowing through the process fluid passage 350. Accordingly, in the exhaust heat recovery apparatus 150B, power generation is performed by the Rankine cycle 155 and the power generator 170, and the process fluid to be supplied to the regeneration region 342 of the concentration unit 340 is preheated.

The generated electric power is used, for example, for actuating a device which consumes power in the deodorization system 300A, such as an adsorbent rotor of the concentration unit 340, a fan, or the like. Accordingly, electric power to be supplied to the deodorization system 300A from outside can be reduced. Further, because the process fluid is preheated by the exhaust heat recovery apparatus 150A, the quantity of heat for preheating the process fluid to be supplied to the concentration unit 340 can be reduced. This allows reduction in fuel consumed by the deodorization system 300A. As a result, the deodorization system 300A attains high energy-saving performance. The generated electric power may be supplied to the outside of the deodorization system 300A.

Modified Examples

Figure 8:
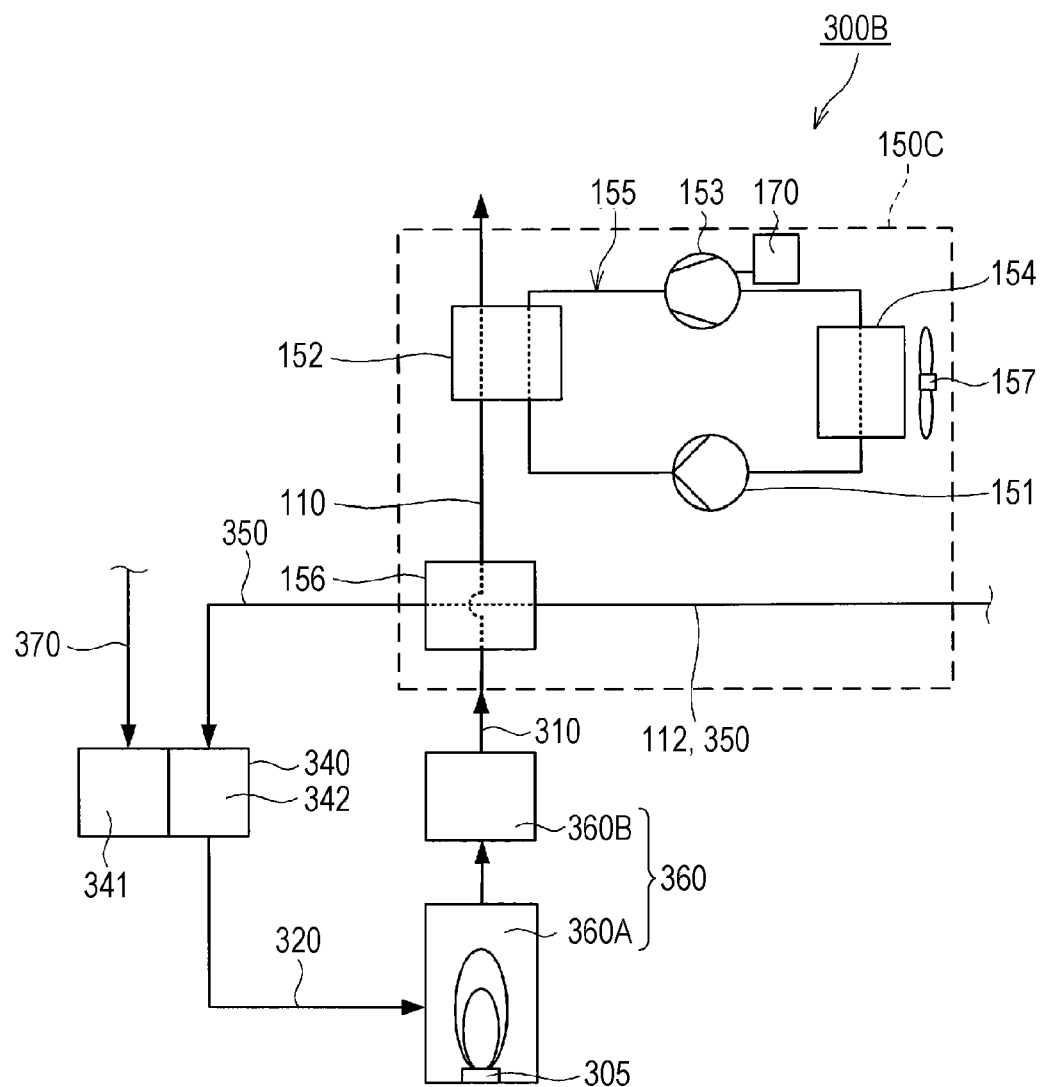
FIG. 8 is a block diagram of a deodorization system according to a modified example.
Figure 9:
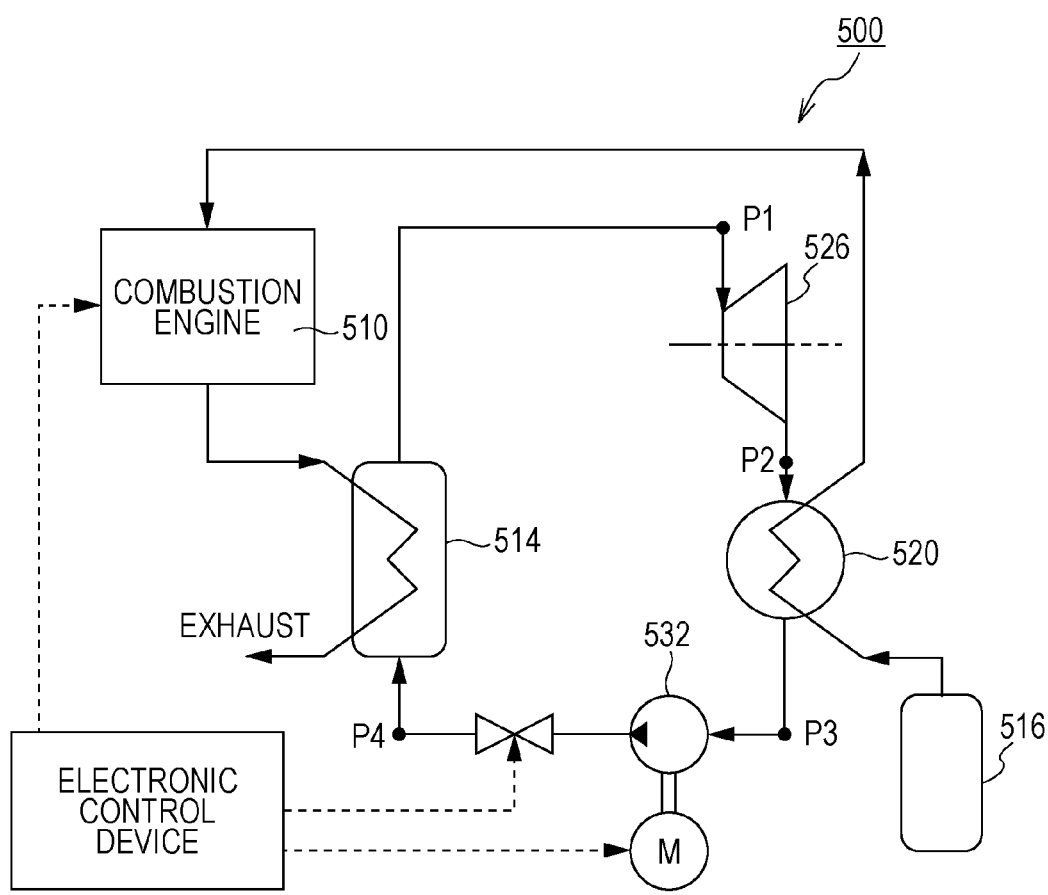
FIG. 9 is a block diagram of an exhaust heat recovery apparatus of related art.

Various modifications may be made to the deodorization system 300A. The deodorization system 300A may be modified, for example, to a deodorization system 300B, as illustrated in FIG. 8. The deodorization system 300B is configured similarly to the deodorization system 300A with the exception that the exhaust heat recovery apparatus 150C is used instead of the exhaust heat recovery apparatus 150B. With such a configuration, effects similar to those in the deodorization system 300A can be attained.

In the deodorization system 300A, the specific heat process is not limited to the heat process in the concentration unit 340. For example, the specific heat process may be combustion of odor material at the combustor 360. That is, a modification may be made such that a preheated process fluid is supplied to the combustor 360 and is used as air for combustion. The concentration unit 340 may be omitted. The combustor 360 does not need to be configured in accordance with a method of catalytic combustion of odor material. The combustor 360 may be configured, for example, in accordance with a direct combustion method in which odor material is directly burned by a burner. The deodorization system 300B may be modified in a similar manner. Further, the deodorization system 300A may be modified in such a manner that the exhaust heat recovery apparatus 150A or the exhaust heat recovery apparatus 150D is used instead of the exhaust heat recovery apparatus 150B.

What is claimed is:

1. An exhaust heat recovery apparatus comprising:
   an exhaust heat passage through which a first heat medium holding exhaust heat flows;
   a second heat medium passage through which a second heat medium flows, a temperature of the second heat medium being lower than that of the first heat medium;
   a Rankine cycle which includes a pump, an evaporator, an expander, and a condenser, and which causes heat exchange to be performed at the evaporator between the first heat medium flowing through the exhaust heat passage and a working fluid, so that the working fluid is evaporated, the evaporated working fluid expands at the expander, and a power is generated; and
   an exhaust heat recovery heat exchanger which causes heat exchange to be performed between the first heat medium flowing through the exhaust heat passage and the second heat medium flowing through the second heat medium passage, so that the second heat medium is heated and the exhaust heat held by the first heat medium is recovered,
   wherein the exhaust heat recovery heat exchanger causes heat exchange to be performed between the first heat medium which has been subjected to the heat exchange with the working fluid at the evaporator and which flows through the exhaust heat passage, and the second heat medium which flows through the second heat medium passage.

2. The exhaust heat recovery apparatus according to claim 1, wherein the second heat medium passage is configured to supply to a specific heat process the second heat medium that has been heated at the exhaust heat recovery heat exchanger.

3. The exhaust heat recovery apparatus according to claim 1, further comprising a power generator which generates electric power by the power.

4. The exhaust heat recovery apparatus according to claim 1, wherein the Rankine cycle causes heat exchange to be performed at the condenser between the working fluid which has expanded at the expander and the second heat medium which flows through the second heat medium passage located upstream of the exhausted heat recovery heat exchanger, so that the working fluid condenses.

5. The exhaust heat recovery apparatus according to claim 4, wherein the exhaust heat recovery heat exchanger causes heat exchange to be performed between the first heat medium which has been subjected to the heat exchange with the working fluid at the evaporator and which flows through the exhaust heat passage, and the second heat medium which has been subjected to the heat exchange with the working fluid at the condenser and which flows through the second heat medium passage.

6. The exhaust heat recovery apparatus according to claim 1,
wherein the Rankine cycle causes heat exchange to be performed at the condenser between the working fluid which has expanded at the expander and a cooling medium which is different from the second heat medium, so that the working fluid condenses.

7. A heating system comprising:
a combustor;
a heating space in which an object to be heated is heated using heat generated at the combustor;
an exhaust passage through which the exhaust gas generated in the heating space is discharged;
a suction passage through which outside air is supplied to the combustor; and
the exhaust heat recovery apparatus according to claim 5,
wherein the exhaust heat passage is connected to the exhaust passage so that the exhaust gas is supplied as the first heat medium to the exhaust heat passage, and
wherein the second heat medium passage forms at least part of the suction passage so that the outside air is supplied as the second heat medium to the combustor through the second heat medium passage.

8. The heating system according to claim 7, further comprising a reheating passage through which part of air in the heating space is supplied to the combustor.

* * * * *